(12) United States Patent
Abuelsaad et al.

(10) Patent No.: US 9,910,922 B2
(45) Date of Patent: Mar. 6, 2018

(54) ANALYSIS OF USER'S DATA TO RECOMMEND CONNECTIONS

(71) Applicant: International Business Machines Corporation, Armonk, NY (US)

(72) Inventors: Tamer E. Abuelsaad, Somers, NY (US); Gregory J. Boss, Saginaw, MI (US); John M. Ganci, Jr., Cary, NC (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 14/471,100

(22) Filed: Aug. 28, 2014

(65) Prior Publication Data
US 2016/0063116 A1    Mar. 3, 2016

(51) Int. Cl.
*G06F 17/30*   (2006.01)
*G06Q 50/00*   (2012.01)

(52) U.S. Cl.
CPC .. *G06F 17/30867* (2013.01); *G06F 17/30997* (2013.01); *G06Q 50/01* (2013.01)

(58) Field of Classification Search
CPC .......... G06F 17/30867; G06F 17/3053; G06Q 50/01
USPC .................. 707/731, 750, 751, 776, 777
See application file for complete search history.

(56) References Cited

U.S. PATENT DOCUMENTS

| | | | |
|---|---|---|---|
| 7,945,862 B2 | 5/2011 | Aldrich et al. | |
| 2008/0270038 A1* | 10/2008 | Partovi | G06Q 10/00 702/19 |
| 2009/0132368 A1* | 5/2009 | Cotter | G06Q 30/0257 705/14.55 |
| 2009/0150330 A1* | 6/2009 | Gobeyn | G06Q 30/0269 |
| 2009/0157605 A1* | 6/2009 | Kelly | G06F 17/3012 |
| 2009/0319288 A1 | 12/2009 | Slaney et al. | |
| 2010/0070564 A1 | 3/2010 | Ehms et al. | |
| 2012/0030025 A1* | 2/2012 | Pan | G06Q 30/0269 705/14.66 |
| 2012/0297038 A1* | 11/2012 | Mei | G06Q 50/01 709/223 |
| 2015/0032535 A1* | 1/2015 | Li | G06Q 30/0255 705/14.53 |

FOREIGN PATENT DOCUMENTS

WO     2005074445 A2    8/2005

OTHER PUBLICATIONS

Cheah et al., "Provenance Analysis: Towards Quality Provenance", 2012 IEEE 8th International Conference on E-Science, Oct. 8-12, 2012, Chicago, IL, pp. 1-8, © 2012 IEEE.

(Continued)

*Primary Examiner* — Hares Jami
(74) *Attorney, Agent, or Firm* — Alexander G. Jochym

(57) ABSTRACT

One or more files associated with a user are scanned. Metadata corresponding to the one or more files is determined. One or more categories based on the one or more files is determined, wherein the one or more categories is associated with the user. One or more categories are modified based on the metadata corresponding to the one or more files.

12 Claims, 2 Drawing Sheets

(56) References Cited

OTHER PUBLICATIONS

Chitu, Alex, "How Google Desktop Ranks Search Results", Google Operating System, Unofficial news and tips about Google, Mar. 5, 2007, <http://googlesystem.blogspot.com/br/2007/03/how-google-desktop-ranks-search-results>.

IBM, "System and method for management of social networks' dynamics", An IP.com Prior Art Database Technical Disclosure, Published Oct. 15, 2009, IP.com No. IPCOM000188645D, pp. 1-7.

Kim et al., "Topic-Driven SocialRank: Personalized search result ranking by identifying similar, credible users in a social network", Knowledge-Based Systems 54 (2013), Elsevier, pp. 230-242, © 2013 Elsevier B.V.

Sunder, Shyam, "System for Facilitating Social Help", An IP.com Prior Art Database Technical Disclosure, Published Nov. 16, 2013, IP.com No. IPCOM000232562D, pp. 1-13.

"Interaction Discovery Using a Social Mobile Application", Authors Disclosed Anonymously, An IP.com Prior Art Database Technical Disclosure, Published Apr. 22, 2013, IP.com No. IPCOM000226834D, pp. 1-13.

\* cited by examiner

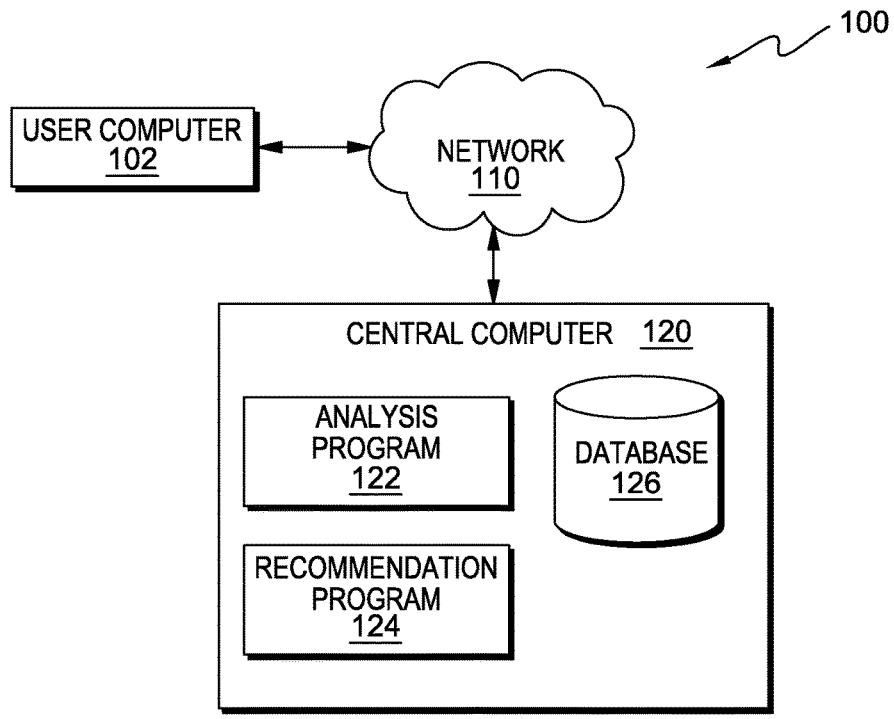
FIG. 1
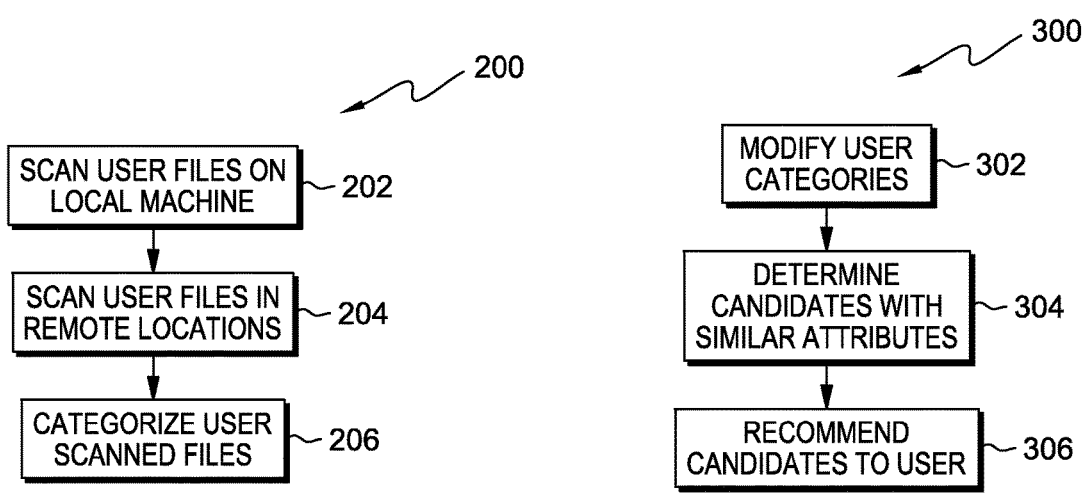
FIG. 2
FIG. 3

ANALYSIS OF USER'S DATA TO RECOMMEND CONNECTIONS

FIELD OF THE INVENTION

The present disclosure relates generally to the field of social media, and more particularly to determining potential connections for users of social media.

BACKGROUND

Social media is the social interaction among people in which they create, share, or exchange information and ideas in virtual communities and networks. Social media have a huge market potential, financially, and companies like Facebook, Google, and LinkedIn have realized hundreds of millions of dollars in profit by leveraging peoples' social media networks. (Note: the term(s) "FACEBOOK", "GOOGLE" and/or "LINKEDIN" may be subject to trademark rights in various jurisdictions throughout the world and are used here only in reference to products or services properly denominated by the marks to the extent that such trademark rights may exist.) A persons' social media network becomes more valuable to themselves and to the social media company as the network grows because this exposes more targeted content to a specific user for, and on behalf of, trust sources. It is therefore common for social media companies to devise ways to recommend to users other people that are similar to themselves, so that they add them to their personal networks.

Many social media companies will make these recommendations based upon an evaluation of how interconnected the existing second, third, and fourth generation connections of users are. For example, if two people both have the same person listed in their network, the social media company may suggest that those people become connected. Other social media companies may make recommendations based on commonalities in attributes in the profile (user name, birth location, school attended, etc.). Others will attempt to infer possible connections from strangers based solely on the types of content they both comment on within the social network.

SUMMARY

Embodiments of the present invention include a method, computer program product, and system for determining connections for users of social media. In one embodiment, one or more files associated with a user are scanned. The metadata corresponding to the one or more files is determined. One or more categories based on the one or more files are determined, wherein the one or more categories is associated with the user. The one or more categories are modified based on the metadata corresponding to the one or more files.

BRIEF DESCRIPTION OF THE SEVERAL VIEWS OF THE DRAWINGS

FIG. 1 is a block diagram illustrating an environment, according to an embodiment of the present invention.

FIG. 2 is a flowchart depicting the operational steps of analysis program, on a central computer within the environment of FIG. 1, according to an embodiment of the present invention.

FIG. 3 is a flowchart depicting the operation steps of recommendation program, on a central computer within the environment of FIG. 1, according to an embodiment of the present invention.

DETAILED DESCRIPTION

Figure 4:
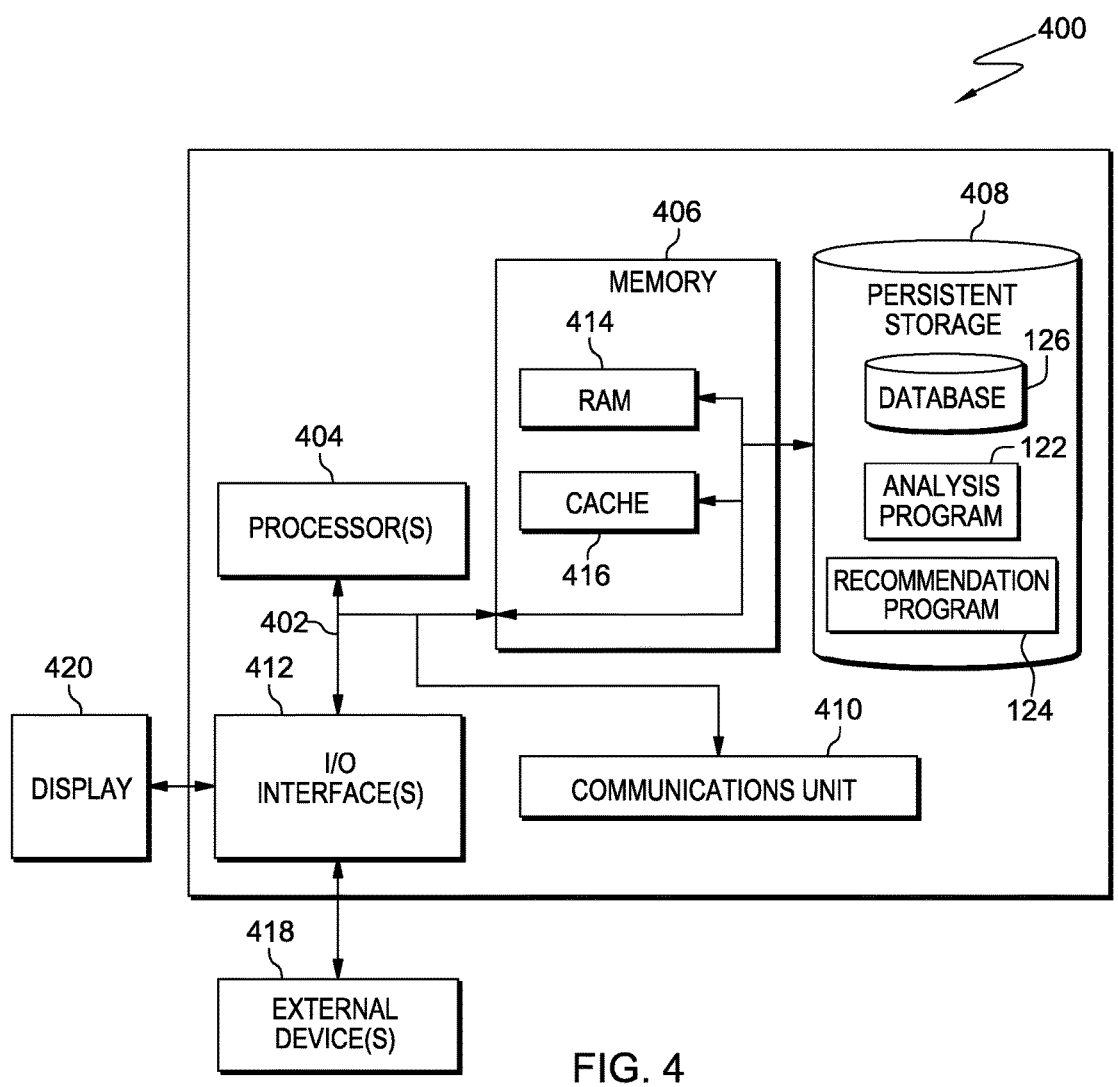
FIG. 4 depicts a block diagram of components of the central computer executing the analysis program and the recommendation program, according to an embodiment of the present invention.

With reference now to FIGS. 1-4, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention will now be described in detail with reference to the Figures. FIG. 1 is a block diagram illustrating an environment, generally designated 100, in accordance with one embodiment of the present invention.

Environment 100 includes user computer 102 and central computer 120, all interconnected over network 110. Network 110 can be, for example, a local area network (LAN), a wide area network (WAN) such as the Internet, or a combination of the two, and can include wired, wireless, or fiber optic connections. Network 110 may be a distributed computing environment utilizing clustered computers and components that act as a single pool of seamless resources, as is common in data centers and with cloud computing applications or "clouds". In general, network 110 can be any combination of connections and protocols that will support communications between user computer 102 and central computer 120.

In various embodiments of the present invention, user computer 102 may be a laptop computer, tablet computer, netbook computer, personal computer (PC), a desktop computer, a personal digital assistant (PDA), a smart phone, or any programmable electronic device capable of communicating with central computer 120 via network 110. In other embodiments, user computer 102 may represent a server computer system utilizing multiple computers as a server system, such as in a cloud computing environment. In an alternative embodiment, user computer 102 may be any number of computers utilized by any number of users. Each user computer 102 may have a plurality of users with different user profiles and each profile has files, bookmarks, blogs, cloud connections, etc., specific to that user.

In various embodiments of the present invention, central computer 120 may be a laptop computer, tablet computer, netbook computer, personal computer (PC), a desktop computer, a personal digital assistant (PDA), a smart phone, or any programmable electronic device capable of communicating with user computer 102 via network 110. Central computer 120 includes analysis program 122, recommendation program 124, and database 126. In an alternative embodiment, analysis program 122, recommendation program 124, or database 126 may be found on user computer 102, or any other device that is suitable for the foregoing intended use and accessible via central computer 120 via network 110.

Analysis program 122 is a program, application, or sub-program of a larger program that scans and crawls through the files of a user saved locally on the user's computer or on the internet, e.g. the cloud. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. In an embodiment, analysis program 122 is located on central computer 120. In an alternative embodiment, analysis program 122 can be located on user computer 102 or any locations accessible via network 110. The user can be, for example, a person that owns a computer for their own personal use at home. Alternatively, the user can be a person that is using a computer that they were granted access to for a period of time, for example, in a work or office environment. Analysis program 122 scans files that include, but are not limited to, media files found on a storage device that may be organized by a file system (documents, audio, video, images, etc., or any combination thereof), bookmarks, favorites, cloud data, and/or social data (including blogs, microblogs, wikis, etc.). In each of these files, analysis program 122 scans the files for metadata that includes, but is not limited to, last access date of the file, last modification date, user who last modified, frequency of access of the file, location of the file in the file system, file directory depth, parent directory names, relation of user to the file (i.e., content creator, content collaborator, content reviewer, etc.), and/or data provenance. Data provenance of digital objects represents their origins. Provenance records contain descriptions of the entities and activities involved in producing and delivering (and otherwise influencing) a given object. Analysis program 122 then aggregates and summarizes the metadata into categorical knowledge based upon skills, hobbies, or interests.

Recommendation program 124 is a program, application, or subprogram of a larger program, which uses the resulting categorical knowledge of the files determined by analysis program 122 to determine candidates with similar skills, hobbies, or interests. Candidates are other users of social networks or communities that the user can connect with to broaden or enlarge their contacts. In an embodiment, recommendation program 124 is located on central computer 120. In an alternative embodiment, recommendation program 124 can be located on user computer 102 or any locations accessible via network 110. In an embodiment, the candidates have their own files scanned and crawled by analysis program 122, and then the resulting files' metadata are aggregated and summarized by recommendation program 124 prior to, or at the same time as, the current user is being processed by analysis program 122 and/or recommendation program 124. In an alternative embodiment, the candidates have their files scanned, crawled, aggregated, summarized (or any other operation performed by analysis program 122 or recommendation program 124) by any other program suitable for the foregoing intended use as known in the art. Once a candidate is found with similar matching attributes of the first user, recommendation program 124 can the make a recommendation based upon these similarities. Recommendation program 124 can rank the matching candidates and order them by confidence level of matching with the first user. In an alternative embodiment, recommendation program 124 can recommend the top matches of candidates after comparing a matching value above a threshold. In yet another embodiment, recommendation program 124 can allow the user to browse all matches of other candidates and allow the user to connect with any number of them.

In any embodiment, analysis program 122 and recommendation program 124 may include a user interface (not shown). A user interface is a program that provides an interface for the user to interact with the program, and the user interface program may be found internal to analysis program 122 and recommendation program 124. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphic icons and visual indicators, such as secondary notation, as opposed to text-based interfaces, typed command labels, or text navigation. The actions in GUIs are often performed through direct manipulation of the graphics elements. In an alternative embodiment, command-line interfaces, which require commands to be typed on the keyboard, can be used by the user to manipulate analysis program 122 and recommendation program 124.

Database 126 resides on central computer 120. In an alternative embodiment, database 126 may reside on user computer 102, or on another device or component accessible via network 110. A database is an organized collection of data. Data found in a database is typically organized to model relevant aspects of reality in a way that supports processes requiring the information found in the database. Database 126 can be implemented with any type of storage device capable of storing data that may be accessed and utilized by central computer 120, such as a database server, a hard disk drive, or a flash memory. In other embodiments, database 126 can represent multiple storage devices within central computer 120. Database 126 may include data relating to at least one of a plurality of users, such as data that analysis program 122 has discovered or data that recommendation program 124 has determined. For example, database 126 may include data relating to all the files scanned on a user's computer as found by analysis program 122. In another example, database 126 may include data relating to the categorical knowledge of skills, hobbies, interests, etc. of a user as determined by recommendation program 124.

Alternatively, database 126 can be any computer readable storage medium as found in the art. For example, the computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Central computer 120 may include internal and external hardware components, as depicted and described in further detail with respect to FIG. 4.

FIG. 2 is a flowchart of workflow 200 depicting operational steps for scanning and crawling through a user's files saved locally on the user's computer, a computer accessible via network 110 or on the internet, e.g., the cloud, and then categorizing the files using their associated metadata, in accordance with an embodiment of the present invention. In one embodiment, the steps of the workflow are performed by analysis program 122. Alternatively, the steps of the workflow can be performed by recommendation program 124 or by both programs. In a preferred embodiment, a user, via a user interface discussed previously, can invoke workflow 200 upon determining that they would like their files analyzed, so as to find users they share similarities with. In an alternative embodiment, workflow 200 can be invoked automatically under the control of another program, for example, upon logging into or accessing a social media website, the social media website may indicate to analysis program 122 to begin a step in workflow 200. In yet another embodiment, workflow 200 can be invoked upon a user logging into an operating system or after the boot process, or initialization, of an operating system.

Analysis program 122 scans user files on the user's local machine (step 202). Analysis program 122 scans through the user files found on user computer 102. In an alternative embodiment, user may designate a certain part or directory of user's computer for analysis, for example, a part of user computer 102 that is associated with a user's profile. As discussed previously, analysis program 122 can scan files that include, but are not limited to, media files found on a storage device that may be organized by a file system (documents, audio, video, images, etc., or any combination thereof), bookmarks (as found in web browsers, text documents, desktop locations, Operating Systems "OS", etc.), and/or favorites (as found in web browsers, text documents, OS, etc.). For example, analysis program 122 scans the hard drive of user's computer, and more specifically the local hard disk visible to and hosting the user's OS. In an embodiment, user computer 102 may have a plurality of hard disks or any other form of computer readable storage medium that may be scanned, regardless of the location of the OS. In one example, analysis program 122 finds a directory named "Music" and more specifically, a plurality of user's music files found within that directory.

When analysis program 122 has completed scanning for files on the user's local machine, analysis program 122 scans those files to determine metadata associated with those files. The metadata includes, but is not limited to, last access date of the file, last modification date, user who last modified, frequency of access of the file, location of the file in the file system, location of a file in a file directory, parent directory names, relation of user to the file (i.e., content creator, content collaborator, content reviewer, etc.), and/or data provenance. For example, analysis program analyzes the metadata relating to the music files found above. The metadata may include information that the user was the person that saved the music file in the parent directory named "Music", it was last accessed a month before the scan date by the user, the file is specifically located in a folder named "Cowboy Artist" inside of the directory named "Music", the audio file's genre or style of music is "Country" music, and the audio file name is "Red Pickup Truck".

In an alternative embodiment, analysis program 122 analyzes files for key words or words that are used repeatedly. In other words, analysis program 122 looks directly into the file. For example, if the file were a document, analysis program 122 scans the text in the document. Here, if the document was about "Dogs", analysis program 122, upon analyzing all the words found in the document, may find a key word related to "Labrador" and, more specifically, "Chocolate Labrador." The words would be used repeatedly throughout the document and the document may be tagged, via a form of metadata, with the words as well by another party. In an alternative embodiment, analysis program 122 can perform additional, more in-depth analysis that can determine the lyrics of a song in an audio file. For example, in the above mentioned audio file, "Red Pickup Truck", analysis program 122 can determine the lyrics of the song and that the word "Alabama" is found throughout the lyrics. The words would be used repeatedly throughout the lyrics and the audio file may be tagged, via a form of metadata, with the words as well by another party.

Additionally, analysis program 122 can use metadata related to bookmarks and favorites to determine external websites that the user frequents or contributes to. For example, analysis program 122 determines that the user has a folder in their books marks named "Soccer". Additionally, analysis program 122 analyzes the websites found within the folder "Soccer" and determines that websites are related to a soccer league named "English Premier League" and, more specifically, to a soccer team called "Liverpool." In an alternative embodiment, analysis program 122 determines if the user has contributed any content to the websites found in the bookmarks or favorites. For example, if the user has written an article on the website or has commented on an article on the website.

Analysis program 122 stores information relating to the files found in the scan and metadata for said files in database 126. In an alternative embodiment, analysis 122 stores information relating to the files found in the scan and metadata for said files on user computer 102, another location on central computer 120, the cloud, or any other location accessible via network 110.

Analysis program 122 scans user files in remote locations (step 204). Remote locations accessible via the internet include, but are not limited to, the cloud, a computer or machine (not shown) that the user has access to via network 110, a smart phone, or any other device related to the user accessible via network 110. In an alternative embodiment, user may designate a certain part or directory of the remote locations for analysis, for example, a part of the cloud that is associated with a user. When analysis program 122 has completed scanning for files in remote locations, analysis program 122 scans those files to determine metadata associated with those files. The metadata includes, but is not limited to, last access date of the file, last modification date, user who last modified, frequency of access of the file, location of the file in the file system, location of a file in a file directory, parent directory names, relation of user to the file (i.e., content creator, content collaborator, content reviewer, etc.), and/or data provenance. Similar to step 202, mentioned above, analysis program 122 scans for files and then scans the metadata related to the found files.

Analysis program 122 categorizes scanned user files (step 206). Analysis program 122 uses the metadata found in the previous steps to determine categorical knowledge of a user. Categorical knowledge of a user includes, but is not limited to, a plurality of categories, skills, or interests that describe or define a user. Analysis program 122 can determine categorical knowledge of the user based on the metadata using at least one of key word analysis, provenance analysis, frequency of modification of files, or last time of modification of files.

Analysis program 122 determines categorical knowledge percentiles based on the frequency of metadata related to a topic. In other words, the more common or popular a topic is when searching through a user's metadata, the larger percentile of the user's categorical knowledge that topic will take up. For example, if analysis program 122 determines there are a total of three hundred pieces of metadata that can be found related to a user, and thirty of those pieces are related to fly fishing, than the user's categorical knowledge will contain 10% fly fishing. In an alternative embodiment, analysis program 122 notifies the user of the categorical knowledge percentiles that analysis program 122 has calculated based on the user's metadata and the user, via the user interface discussed previously, can edit and manipulate their categorical knowledge to remove areas that the user is not as interested in and vice versa so as to more accurately describe the user's characteristics. In yet another embodiment, analysis program 122 can access the characteristics of a user profile (not shown) that a user created for themselves, and, using the characteristics of the user profile (i.e. age, likes, dislikes, hobbies, interests, etc.), analysis program 122 can edit and manipulate the user categorical knowledge to increase or decrease the percentage of a user's characteristics to make the percentages more accurate as compared to the profile the user created.

In an embodiment of the present invention, the total percentage of all the categorical knowledge (categories, skills, or interests) for the user is 100%. For example, the user has categorical knowledge that is 40% country music, 20% pickup trucks, 10% soccer, 10% electricity, 10% fly fishing, and 10% space travel. Alternatively, the total percentage of all the categorical knowledge for the user is less than 100% and the remaining percentage is not defined for the user or is listed as unknown. The categorical knowledge is stored on database 126. In an alternative embodiment, analysis 122 stores categorical knowledge on user computer 102, another location on central computer 120, the cloud, or any other location accessible via network 110.

FIG. 3 is a flowchart of workflow 300 depicting operational steps for modifying and using categorical knowledge of the user to determine candidates with similar categorical knowledge to the user and, upon determining candidates, notifying the user of these candidates. In one embodiment, the steps of workflow 300 are performed by recommendation program 124. Alternatively, the steps of the workflow can be performed by analysis program 122, or by both programs. In a preferred embodiment, a user invokes workflow 300 upon the user determining they would like to use their categorical knowledge to find users they share similarities with. In an alternative embodiment, workflow 300 is invoked upon the completion of step 206 of workflow 200. In yet another embodiment, workflow 300 is invoked automatically under the control of another program, for example, upon logging into or going to a social media website or upon the completion of workflow 200 by analysis program 122.

Recommendation program 124 modifies user categories (step 302). In other words, recommendation program 124 receives the categorical knowledge of the user determined by analysis program 122 in step 206 along with the metadata determined in step 202 and 204, and then modifies the user categories using the aforementioned metadata. In an embodiment, analysis program 122 sends the user categories, determined in step 206, to recommendation program 124 upon completion of step 206. In an alternative embodiment, recommendation program 124 receives user categories by the information from database 126, previously stored there during step 206. Alternatively, recommendation program 124 can retrieve user categories by retrieving the information from user computer 102, any other location on central computer 120, or any other location accessible via network 110. In alternative embodiments, the categorical knowledge may have been determined by a social network, determined by the user, determined by a third party, determined by any other person, or determined by a service and this information may be sent directly to recommendation program 124 or may be stored in database 126 for retrieval by recommendation program 124 upon invoking workflow 300.

After receiving the categorical knowledge of the user and the associated metadata, recommendation program 124 modifies the categorical knowledge of the user using the associated metadata. For example, as discussed previously, it has been determined, in step 206, that user has categorical knowledge that is 40% country music, 20% pickup trucks, 10% soccer, 10% electricity, 10% fly fishing, and 10% space travel. However, the metadata associated with the 40% country music indicates that the country music files have not been accessed in two years and were not created by the user but only accessed by the user a few times. For example, a friend of the user sent the country music files to the user and the user listened to them a few times when the user received them but since then has not accessed the files. Therefore, recommendation program 124 modifies the categorical knowledge to now only include 20% country music. The metadata associated with the 10% fly fishing indicates that the user has been accessing the fly fishing files at least daily and sometimes more than once a day. For example, the user may be planning a fly fishing trip in the near future or may have just purchased new fly fishing gear and has a recent interest in fly fishing. Therefore, recommendation program 124 modifies the categorical knowledge to now include 25% fly fishing. The metadata associated with the 20% pickup trucks indicates that the user has been accessing internet bookmarks and websites related to pickup trucks and purchasing pickup trucks more than once a day in the last few weeks. For example, the user may be planning on purchasing a pickup truck and/or selling their old pickup truck in the near future. Therefore, recommendation program 124 modifies the categorical knowledge to now include 25% pickup trucks. The metadata associated with the 10% soccer, 10% electricity, and 10% space travel does not indicate that it should be modified. The user now has a modified categorical knowledge that is 20% country music, 25% pickup trucks, 10% soccer, 10% electricity, 25% fly fishing, and 10% space travel.

Recommendation program 124 determines candidates with similar attributes (step 304). Recommendation program 124 queries database 126 for information related to other candidates that have previously, or at the same time as the user, had their categorical knowledge determined and then stored in database 126. Recommendation program 124 compares the categorical knowledge of the user to the categorical knowledge of all candidates found in database 126. Recommendation program 124 determines candidates that have similar categorical information to the user. In other words, Recommendation program 124 searches for candidates that have at least one category that is the same as the one or more categories associated with the user. In an alternative embodiment, recommendation program 124 searches for candidates that have at least two categories that are the same as the one or more categories associated with the user. In yet another alternative embodiment, recommendation program 124 searches for candidates that have at least three categories that are the same as the one or more categories associated with the user.

For example, as discussed previously, the user has a modified categorical knowledge that is 20% country music, 25% pickup trucks, 10% soccer, 10% electricity, 25% fly fishing, and 10% space travel. Candidate #1 may have categorical knowledge that is 30% rock music, 25% luxury cars, 10% baseball, 10% electricity, 5% fly fishing, and 20% England travel. Candidate #2 may have categorical knowledge that is 35% country music, 15% pickup trucks, 5% hockey, 25% fly fishing, and 20% Spain travel. Candidate #1 has two categories that are the same as the user's one or more categories (electricity and fly fishing). Candidate #2 has three categories that are the same as the user's one or more categories (country music, pickup trucks, and fly fishing). Although the user and the candidates do not have identical categorical knowledge, recommendation program 124 may determine that the user and the candidate have enough categorical knowledge that is the same to warrant further analysis.

Recommendation program 124, upon determining that candidates #1 and #2 have at least one category the same as the categories of the user, then determines how much the user categories and candidates categories overlap. For example, recommendation program 124 determines that the user and candidate #1 overlap 15%. They overlap with fly fishing 5% (User=25% and Candidate #1=5%, overlap=5%) and with electricity 10% (User=10% and Candidate #1=10%, overlap=10%) and therefore overlap a total of 15%. Additionally, recommendation program 124 determines that the user and candidate #2 overlap 60%. They overlap with country music 20% (User=20% and Candidate #2=35%, overlap=20%), with pickup trucks 15% (User=25% and Candidate #2=15%, overlap=15%), and with fly fishing 25% (User=25% and Candidate #2=25%, overlap=25%) and therefore overlap a total of 60%.

Recommendation program 124 recommends candidate(s) to the user (step 306). Recommendation program 124 determines a candidate to recommend to the user. In an alternative embodiment, recommendation program 124 may recommend all candidates that recommendation program 124 determined to have at least one category the same as the user, and present them to the user in an order that highlights, hints, or arranges candidates that are more similar to the user than other candidates. In other words, candidates with more overlap percentage will be highlighted, hinted, or arranged in an order that is more preferential to them as compared to a candidate with less overlap percentage. In yet another embodiment, recommendation program 124 can allow the user to browse all candidates with at least one matching category and allow the user to connect with any one of the candidates that the user is interested in.

In an alternative embodiment, recommendation program 124 can rank the matching candidates and order them by the amount over overlap percentage the user and candidate share. In yet another embodiment, recommendation program 124 can recommend the top matches of candidates after comparing a matching value above a threshold. The threshold is a percentage of overlap as determined by what the user indicated they wanted the threshold to be in their profile. Alternatively, the threshold could be a standard for recommendation program 124 (i.e., 30% overlap). For example, recommendation program 124 recommends that the user should connect to Candidate #2 because the overlap (60%) is above the threshold (30%). In an alternative embodiment, recommendation program 124 recommends that the user should connect to Candidate #2 and Candidate #1 because they each have at least one category in common. In yet another alternative embodiment, recommendation program 124 recommends that the user should connect to Candidate #2 and Candidate #1, and when giving this recommendation to the user, indicates to user that Candidate #2 has an overlap percentage of 60% and Candidate #1 has an overlap percentage of 15%. Recommendation program 124 may recommend to the user that Candidate #2 would be a more optimal connection as compared to candidate #1 due to the overlap percentage of categorical knowledge.

FIG. 4 depicts a block diagram of components of computing system 400 capable of operating analysis program 122 or recommendation program 124, and components of central computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Central computer 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Analysis program 122 and recommendation program 124 are stored in persistent storage 408 for execution by one or more of the respective computer processors 404 via one or more memories of memory 406. Database 126 is stored in persistent storage 408 for execution and/or access by one or more of the respective computer processors. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of user computer 102. In these examples, communications unit 410 includes one or more network interface cards. Communications unit 410 may provide communications through the use of either or both physical and wireless communications links. Analysis program 122 and recommendation program 124 may be downloaded to persistent storage 408 through communications unit 410.

I/O interface(s) 412 allows for input and output of data with other devices that may be connected to central computer 120. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., analysis program 122, recommendation program 124, and database 126, can be stored on such portable computer-readable storage media and can be loaded onto persistent storage 408 via I/O interface(s) 412. I/O interface(s) 412 also connects to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for determining connections for users of social media, the method comprising the steps of:
    scanning, by a computer processor, one or more files associated with a user;
    determining, by a computer processor, metadata corresponding to the one or more files;
    determining, by a computer processor, one or more categories based on the one or more files, wherein the one or more categories is associated with the user;
    modifying, by a computer processor, the one or more categories based on the metadata corresponding to the one or more files to create a percentage for each category of the one or more categories;
    determining, by a computer processor, a plurality of candidate users with one or more associated categories the same as one category of the one or more categories associated with the user, wherein each associated category of the one or more associated categories has an associated category percentage;
    determining, by a computer processor, an overlap amount between the percentage for each category of the one or more categories of the user and the associated category percentage for each associated category of the one or more associated categories of the plurality of candidate users;
    ranking, by a computer processor, the plurality of candidate users, wherein the plurality of candidate users with a higher amount of the overlap with the user are ranked higher;
    responsive to determining the plurality of candidate users with one or more associated categories the same as one category of the one or more categories associated with the user and ranking, initiating to notify, by the computer processor, the user of the ranked plurality of candidate users;
    receiving, by a computer processor, at least one characteristics of a profile associated with the user;
    modifying, by a computer processor, the percentage for each category of the one or more categories based on the at least one characteristics of the profile associated with the user to create a modified percentage for each category of the one or more categories; and
    wherein the step of determining, by a computer processor, an overlap amount between the percentage for each category of the one or more categories of the user and the percentage for each associated category of the one or more associated categories of the plurality of candidate users comprises:
        determining, by a computer processor, an overlap amount between the modified percentage for each category of the one or more categories of the user and the percentage for each associated category of the one or more associated categories of the plurality of candidate users.

2. The method of claim 1, wherein metadata comprises at least one of: last access time of the one or more files, last modification time of the one or more files, user who last modified the one or more files, frequency of access of the one or more files, location of the one or more files in a file system, the location of the one or more files in a file directory, the parent directory names of the one or more files, relation of the user to the one or more files, and data provenance of the one or more files.

3. The method of claim 1, wherein the user's files comprise at least one of: file systems, documents, audio, video, images, bookmarks, favorites, blogs, microblogs, wikis, social data, cloud data, and cloud connections.

4. The method of claim 1, wherein the user's files are located on at least one of: computer readable storage media and remote computer readable storage media.

5. A computer program product for determining connections for users of social media, the computer program product comprising:
    one or more computer readable storage media; and
    program instructions stored on the one or more computer readable storage media, the program instructions comprising:
        program instructions to scan one or more files associated with a user;
        program instructions to determine metadata corresponding to the one or more files;
        program instructions to determine one or more categories based on the one or more files, wherein the one or more categories is associated with the user;
        program instructions to modify the one or more categories based on the metadata corresponding to the one or more files to create a percentage for each category of the one or more categories;
        program instructions to determine a plurality of candidate users with one or more associated categories the same as one category of the one or more categories associated with the user, wherein each associated category of the one or more associated categories has an associated category percentage;
        program instructions to determine an overlap amount between the percentage for each category of the one or more categories of the user and the associated category percentage for each associated category of the one or more associated categories of the plurality of candidate users;
        program instructions to rank the plurality of candidate users, wherein the plurality of candidate users with a higher amount of overlap with the user are ranked higher;
        program instructions, responsive to determining the plurality of candidate users with one or more associated categories the same as one category of the one or more categories associated with the user and ranking, to initiate to notify the user of the ranked plurality of candidate users;
        program instructions to receive at least one characteristics of a profile associated with the user;
        program instructions to modify the percentage for each category of the one or more categories based on the at least one characteristics of the profile associated with the user to create a modified percentage for each category of the one or more categories; and wherein the program instructions to determine, an overlap amount between the percentage for each category of the one or more categories of the user and the percentage for each associated category of the one or more associated categories of the plurality of candidate users comprises:

program instructions to determine an overlap amount between the modified percentage for each category of the one or more categories of the user and the percentage for each associated category of the one or more associated categories of the plurality of candidate users.

6. The computer program product of claim 5, wherein metadata comprises at least one of: last access time of the one or more files, last modification time of the one or more files, user who last modified the one or more files, frequency of access of the one or more files, location of the one or more files in a file system, the location of the one or more files in a file directions, the parent directory names of the one or more files, relation of the user to the one or more files, and data provenance of the one or more files.

7. The computer program product of claim 5, wherein the user's files comprise at least one of: file systems, documents, audio, video, images, bookmarks, favorites, blogs, microblogs, wikis, social data, cloud data, and cloud connections.

8. The computer program product of claim 5, wherein the user's files are located on at least one of: computer readable storage media and remote computer readable storage media.

9. A computer system for determining connections for users of social media, the computer system comprising:
one or more computer processors;
one or more computer readable storage media; and
program instructions, stored on the one or more computer readable storage media for execution by at least one of the one or more computer processors, the program instructions comprising:
program instructions to scan one or more files associated with a user;
program instructions to determine metadata corresponding to the one or more files;
program instructions to determine one or more categories based on the one or more files, wherein the one or more categories is associated with the user;
program instructions to modify the one or more categories based on the metadata corresponding to the one or more files to create a percentage for each category of the one or more categories;
program instructions to determine a plurality of candidate users with one or more associated categories the same as one category of the one or more categories associated with the user, wherein each associated category of the one or more associated categories has an associated category percentage;
program instructions to determine an overlap amount between the percentage for each category of the one or more categories of the user and the associated category percentage for each associated category of the one or more associated categories of the plurality of candidate users;
program instructions to rank the plurality of candidate users, wherein the plurality of candidate users with a higher amount of overlap with the user are ranked higher;
program instructions, responsive to determining the plurality of candidate users with one or more associated categories the same as one category of the one or more categories associated with the user and ranking, to initiate to notify the user of the ranked plurality of candidate users;
program instructions to receive at least one characteristics of a profile associated with the user;
program instructions to modify the percentage for each category of the one or more categories based on the at least one characteristics of the profile associated with the user to create a modified percentage for each category of the one or more categories; and
wherein the program instructions to determine, an overlap amount between the percentage for each category of the one or more categories of the user and the percentage for each associated category of the one or more associated categories of the plurality of candidate users comprises:
program instructions to determine an overlap amount between the modified percentage for each category of the one or more categories of the user and the percentage for each associated category of the one or more associated categories of the plurality of candidate users.

10. A computer system of claim 9, wherein metadata comprises at least one of: last access time of the one or more files, last modification time of the one or more files, user who last modified the one or more files, frequency of access of the one or more files, location of the one or more files in a file system, the location of the one or more files in a file directory, the parent directory names of the one or more files, relation of the user to the one or more files, and data provenance of the one or more files.

11. A computer system of claim 9, wherein the user's files comprise at least one of: file systems, documents, audio, video, images, bookmarks, favorites, blogs, microblogs, wikis, social data, cloud data, and cloud connections.

12. A computer system of claim 9, wherein the user's files are located on at least one of: computer readable storage media and remote computer readable storage media.

* * * * *